Patented Aug. 14, 1945

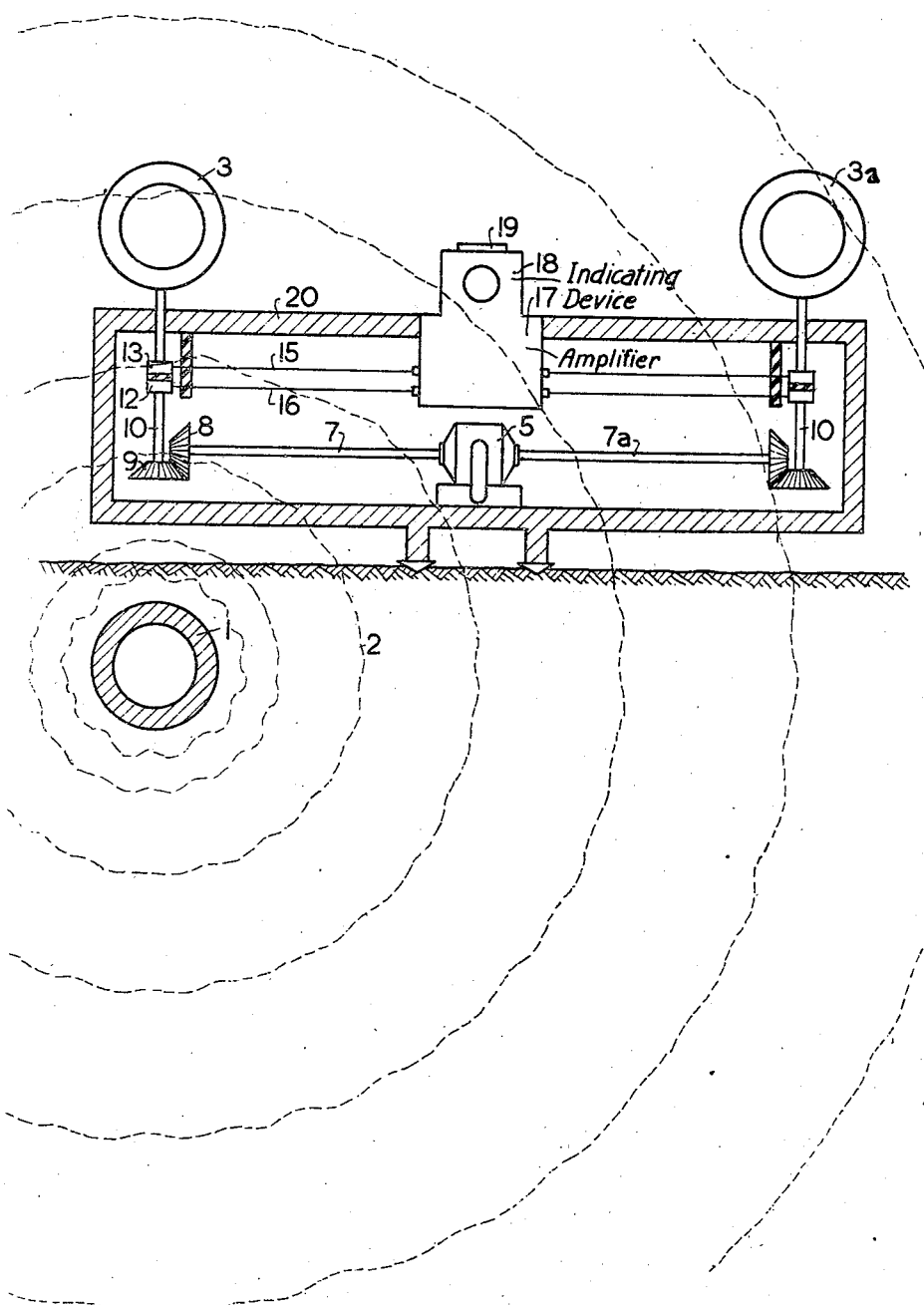

2,382,743

UNITED STATES PATENT OFFICE 2,382,743

ELECTROMAGNETIC APPARATUS FOR PIPE-LINE SURVEYS

Carl J. Penther and Francis B. Rolfson, Oakland, Calif., assignors to Shell Development Company, San Francisco, Calif., a corporation of Delaware Application January 26, 1942, Serial No. 428,337

1 Claim. (Cl. 175—183)

This invention pertains to apparatus for surveying and measuring magnetic and electrical phenomena which are of interest in connection with the determination of factors affecting the electrochemical corrosion of underground structures such as pipe lines.

Electrochemical corrosion of pipe lines or other metallic conductors of considerable length is due to electric currents flowing therein and set up either by galvanic action, as when the pipe passes through soils having different chemical properties and different moisture contents, or by short-circuiting action, as when the pipe serves as a return circuit for currents leaking into the ground from electrical power systems. Electric currents of considerable intensity flow therefore in such conductors or pipe lines, or between the latter and the ground, entering and leaving a conductor at points depending on the composition of the soil and the properties of the conductor itself.

The electrical characteristics of a relatively complex system formed by a pipe line and the ground in which it is embedded are, moreover, subject to constant changes due, for example, to variations in the moisture content of the soil, and to the shifting of the sources of extraneous currents, as in the case of electric trains.

It is therefore of considerable importance to determine the electrical characteristics of such a system as well as the nature of any periodic variations therein, and to establish the points where the pipe line is positive with regard to the ground, and where severe corrosion is therefore taking place by loss of current. Suitable measures may then be taken to combat corrosion at said critical points, for example, by means involving cathodic protection, improved insulation, etc.

Various methods have been proposed to survey the electrical characteristics of buried pipe line systems and to determine the potentials and the intensities of the currents flowing therein. These methods, however, usually involve the use of measuring apparatus electrically connected to the pipe line, and thus require, for each measurement, the steps of uncovering at least a portion of a buried pipe line, and of puncturing its insulation in order that suitable low-resistance connections may be made between the pipe line and the measuring apparatus.

This results, of course, in slowing down operations, limiting the number of observation points, weakening the insulation protection of the pipe line, and disturbing the natural flow of electric currents therein, which in turn may prove a cause for erroneous readings.

It is therefore the object of this invention to provide a method and apparatus for determining the characteristics of the currents flowing in a pipe line or other linear conductor by measuring the magnetic field phenomena set up by said currents in the proximity of said pipe line, whereby the necessity of electrically connecting the pipe line to the measuring apparatus is eliminated.

It is also an object of this invention to provide a method and apparatus for measuring the intensity of the magnetic field surrounding a pipe line or other linear conductor while balancing out the effects of the earth magnetic field prevailing in the vicinity of said conductor or pipe line.

These and other objects of this invention will be understood from the following description taken with reference to the attached drawing, which gives a diagrammatic cross-section view of an embodiment of the apparatus of the present invention.

Referring to the drawing, an electric current flowing in a buried pipe line I sets up a magnetic field schematically shown in the drawing by the lines of force 2. Since the strength of this field is directly proportional to the current flowing in the pipe, the intensity of said current may be determined by measuring the strength of said field by suitably calibrated devices.

Since, however, the magnetic field due to currents of such intensity as are usually flowing in pipe lines is extremely weak, as compared to the earth magnetic field, being, for example, often of the order of one-thousandth thereof, it is necessary to eliminate or to balance out the effects of the earth magnetic field on the measuring apparatus, in order that said earth field effects do not completely obscure the relatively very small effects of the pipe line magnetic field.

It is therefore proposed, according to the present invention, to make use of a measuring system comprising two identical elements sensitive to magnetic field phenomena. These two elements are separated in space, one of them being placed in the closest proximity obtainable under given local conditions to a current-carrying pipe line, and the other being placed at such distance from the pipe line where the effects of the pipe line field on said element are considerably smaller and sometimes negligible. These two elements are connected to the circuit of the indicating or measuring device in such a manner as to oppose each other. In this way the effect of the earth magnetic field, being equal on both elements, may be balanced out without affecting the indicating device, while the effect of the pipe line magnetic field, being at or near a maximum for one of the elements, and considerably smaller for the other element, will result in an indication of the registering device which is not affected, masked or obscured by the superimposed earth field effect.

It is understood that the existence of two different magnetic fields—the earth field and the pipe line field—is discussed hereinabove for the sake of simplicity, whereas only a single resultant field, having an earth effect component and a pipe line effect component actually exists. It is also understood that the difference in response of the two coils to magnetic effects is due to differences in the direction of the magnetic lines of force at the locations of the two coils as well as to the distance separating the remote coil from the pipe line.

Referring to the drawing, the above detecting elements sensitive to magnetic field phenomena may consist of coils 3 and 3a, which are rotated about their axes in such a manner as to intersect magnetic lines of force by means of a motor 5.

In order to eliminate the effect of any stray fields on the detecting apparatus, motor 5 should preferably be of a spring or air-driven type, although a well insulated and shielded electric motor may also be used.

The rotation of the motor 5 is transmitted to the coils, for example, by means of co-axial shafts 7 and 7a, bevel gears 8 and 9, and shafts 10, supporting the coils. Coils 3 and 3a are rotated in opposite directions to generate opposing electromotive forces upon cutting magnetic lines of force. Although vertical shafts 10 are shown in the drawing, it is obvious that the same effect is obtained if the shafts 10 are arranged in a horizontal plane.

Shafts 10 are each provided with slip rings 12 and 13, connected in a manner not shown in the drawing, but obvious to those familiar with the electrical art, to the ends of the wire forming coils 3 and 3a, which may have a suitable diameter such as from 3 to 12 inches, and may comprise, for example, 20,000 turns of wire. The greatest care should be taken to make coils as nearly identical as possible, in order that they may generate identical voltages. The coils 3 and 3a may conveniently be spaced from 3 to 15 feet from each other.

The alternating E. M. F. generated by each coil is transmitted, through slip rings 12 and 13 and conductors 15 and 16, in contact therewith, to an amplifier 17, and an indicating device 18, such as a millivoltmeter.

The whole apparatus may be enclosed in a casing 20, consisting of or comprising a suitable insulating or shielding material to eliminate the effect of stray electric or magnetic effects.

In practice, the apparatus is carried into the field, and placed over a buried or uncovered pipe line, or other conductor of substantial length carrying a current which it is desired to determine. The casing 20 is placed in such manner that coil 3 is directly above the pipe line, while a plane passing through coils 3 and 3a is preferably at right angles to the axis of the pipe line. As will be seen later, the fact that this optimum position has been reached is indicated by the registering device 18, which will give at that moment a maximum reading. A level 19 is provided for levelling the device.

The motor 5 is driven at a suitable speed, such, for example, as 1800 R. P. M. With 4-inch diameter coils having 20,000 turns, a potential of, for example, 1 volt may be supplied by each coil to the indicating device due to the cutting of the earth magnetic field, which potential may be further amplified by means of the device 17. Since the coils 3 and 3a are rotated in opposite directions, these relatively high potentials are balanced out and do not affect the indicating device.

Coil 3, however, besides cutting the earth field lines, cuts also the lines of force of the magnetic field due to the current flowing in the pipe line, and generates therefore an additional potential which is not generated and opposed by coil 3a, since the latter is located outside of the sphere or range of any substantial effects of the pipe line field. This additional potential generated by coil 3 is relatively very small, such as, for the above example, 2 or 3 millivolts. Since, however, the much larger earth field potential (1 volt) is balanced out, the indicating device 18 may be made sufficiently sensitive to give a significant reading for these small potential values.

By suitably calibrating the apparatus, the intensity of the electric current flowing in the pipe line may thus be accurately determined by the present magnetic method. In order for the present device to be suitably calibrated for current, the distance from the pipe to the sensitive element must be known or determined, and the device must have a definite position in space with regard to the pipe. As stated above, the most effective position is that in which one sensitive element is directly over the pipe, while a horizontal line passing through the two elements is at right angles to the axis of the pipe, the existence of this condition being indicated by a maximum reading of the indicating device.

Where the depth of the pipe line is not known from other sources, it may be readily determined by first obtaining the maximum reading, and subsequently moving the whole device along the line passing through the two elements at right angles to the axis of the pipe until a reading equal to one-half of the maximum reading is obtained, whereupon the depth of the pipe may be determined from straight geometrical relations.

By checking the response of the present device to the effect of a direct current passing through a conductor in a known direction, the direction of the current flowing in the pipe line may also be determined in a manner well known in the art.

We claim as our invention:

In a system for magnetically measuring weak electric direct currents flowing in a pipe line, two substantially identical coils capable of generating electric currents by intersecting magnetic lines of force, means rigidly gearing said coils in spaced relationship with each other so that one of said coils is substantially outside of the magnetic field of the pipe line when said coils are disposed in a horizontal plane along a line transverse to the axis of the pipe line with the other coil substantially directly over the pipe line, means comprising said gearing means for rotating said coils in synchronism about their vertical axes, whereby each of said coils is caused to generate an electric current as a function of the strength of the magnetic field at the point where said coil is located, an electrical indicating device, and circuit means electrically connecting said coils to said indicating device for impressing the currents generated by said coils on said indicating device in opposition to each other.

CARL J. PENTHER.
FRANCIS B. ROLFSON.